United States Patent [19]

Blattler et al.

[11] Patent Number: 5,077,332

[45] Date of Patent: Dec. 31, 1991

[54] CHROMATE-FREE WASH PRIMER

[75] Inventors: Paul Blattler, Richmond; Marek Szandorowski, Vancouver, both of Canada

[73] Assignee: Her Majesty the Queen in right of Canada, as represented by the Minister of National Defence, Canada

[21] Appl. No.: 298,014

[22] Filed: Jan. 18, 1989

[30] Foreign Application Priority Data

Mar. 25, 1988 [CA] Canada .................................. 562506

[51] Int. Cl.⁵ ................................................ C08K 3/20
[52] U.S. Cl. ................................... 524/389; 524/405; 524/414; 524/417; 524/492; 524/557
[58] Field of Search ............... 524/389, 405, 417, 557, 524/414, 492

[56]  References Cited

U.S. PATENT DOCUMENTS 4,383,057  5/1983  Yamamoto et al. ............ 524/389 X
4,506,053  3/1985  Sakurai et al. .................... 524/405

Primary Examiner—Joseph L. Schofer
Assistant Examiner—J. M. Reddick
Attorney, Agent, or Firm—Nixon & Vanderhye

[57]  ABSTRACT

A carefully balanced formulation of a chromate-free wash-primer to be applied to the surface of predetermined metals as a surface conditioner to inhibit the spread of corrosion and to act as a tie-coat. The formulation comprises a mixture of polyvinyl butyl resin and an anti-corrosive pigment selected from salts of borates and salts of phosphates. It does not contain toxic components and therefore does not pose hazards to either operators or the environment, upon application or during subsequent thermal operations or maintenance procedures on metal substrates. The physical and application properties of the product according to the present invention are comparable to those of conventional wash-primers, which are based on zinc tetraoxy chromate, polyvinyl butyral solution in organic solvents and phosphoric acid used as the catalyst for the system.

9 Claims, No Drawings

CHROMATE-FREE WASH PRIMER

BACKGROUND OF THE INVENTION

The present invention relates to a wash-primer base paint composition, and more particularly to such a composition, to be mixed with a catalyst composition, to produce a wash-primer which may be applied to the surface of metals, such as galvanized steel, stainless steel and cast iron, aluminum and aluminum alloys, to inhibit the spread of corrosion and to act as a tie-coat.

Wash-primers representing traditional formulations are presently used as surface conditioners to inhibit the spread of corrosion and as tie-coat, mainly for galvanized steel or light metals. The range of substrates which can be coated with conventional wash-primers is much broader. Wash-primers are suitable as pre-treatment coat for substrates such as steel, stainless steel and cast iron, an aluminum and aluminum alloys. Such primers are usually marketed as a two-can (two component) material consisting of a base paint, (pigmented part A) and an acidic or catalyst component (clear part B) which are mixed prior to use, in a weight ratio ranging between 85:15 and 80:20. A standard formulation for such a wash-primer is as follows:

|  | Parts by Weight |
| --- | --- |
| Part A |  |
| Polyvinyl butyral resin | 30.50 |
| Zinc tetraoxy chromate | 29.40 |
| Magnesium silicate | 4.40 |
| Lamp black | 0.33 |
| n-butanol | 68.00 |
| Ethanol (denatured) | 207.00 |
| Total: | 339.63 |
| Part B |  |
| Phosphoric acid (85%) | 15.3 |
| Water (max.) | 13.6 |
| Ethanol (denatured) | 57.1 |
| Total: | 86.0 |

The mixing ratio is 80:20 by weight.

The rust inhibitive and metal substrate prepriming properties of such chromate pigmented wash-primers are based on the following functions of the components:

chromate ions formed in the wash-primer coating, on contact with moisture, provide corrosion inhibition of ferrous substrates;

zinc ions and phosphoric acid tend to create zinc phosphate conversion coating on ferrous substrates and etching effect on many other metals;

the in-situ cross-linked film of polyvinyl butyral resin has excellent adhesion to a variety of metallic substrates, thus providing a strong tie-coat for subsequent organic coatings; and the oxidative properties of chromate ions tend to build up oxide layers on aluminum substrates thus improving their resistance to corrosive environments.

The above functions are achieved in a sequence which take place after the chromate pigmented base part of the wash-primer and the catalyst, which contains phosphoric acid, are mixed together and applied over a metallic substrate:

phosphoric acid converts part of the zinc tetraoxy chromate pigment to chromic acid, zinc phosphate and other chromates of lower basicity;

primary and/or secondary alcohols, present in the mixture, are oxidized by chromic acid to their respective aldehydes and ketones which take part in crosslinking reactions of polyvinyl butyral resin;

phosphoric acid and/or its zinc salts affect metallic substrates either by depositing respective phosphate films or by etching the surface;

chromic phosphate which is formed in the coating material during these processes forms a chelated complex with the polyvinyl butyral resin matrix creating a film that is strongly bonded to the deposited phosphate conversion coating by primary and/or secondary bonds; and free chromates and phosphates remaining in the film serve as a source of inhibitive ions to protect the system against corrosion.

It is well known that the chromates which form an integral part of such conventional wash-primer compositions, are carcinogens and as such pose a potential hazard or danger to the health of persons who are applying them or to persons who are working with metals that have been coated with them.

It is an object of the present invention to provide a wash-primer composition to be used for coating various metallic substrates, which does not employ chromate pigments and yet which provides the same of equivalent performance to conventional, chromate-containing wash-primer compositions.

SUMMARY OF THE INVENTION

In accordance with the present invention there is provided a wash-primer base paint composition, to be mixed with a catalyst composition, to produce a wash-primer which may be applied to the surface of predetermined metals, the base paint composition comprising the following ingredients in the following relative concentrations by weight:

(a) about 40 to 54% (per total non-volatile) polyvinyl butyral resin, having 80 to 85% by weight butyral content, 10 to 20% hydroxyl content and 0 to 2% residual acetate content;

(b) about 20 to 30% (per total non-volatile) anticorrosive pigments selected from the group consisting of salts of borates and salts of phosphates, the weight ratio of salts of borate to salts of phosphate being between about 3:1 to 5:1; and (c) the balance of the ingredients being one or more of:
  (i) a silane coupling agent
  (ii) Hydrophobic pyrogenic silica
  (iii) Inert extenders
  (iv) Inert coloring pigments
  (v) Pigment wetting agents
  (vi) Solvent Blends.

In a preferred embodiment of the present invention, the composition further comprises a silane coupling agent present in a relative concentration by weight of about 3.0 to 4.4% (per total non-volatile) and hydrophobic pyrogenic silica agent present in a relative concentration by weight of about 2.0 to 3.8% (per total non-volatile).

The wash-primer base paint composition in accordance with the present invention, when combined with a conventional catalyst, for example of phosphoric acid, water and isopropyl alcohol, and appropriately diluted with a diluent such as a 1:3 mixture, by weight, of n-butanol and isopropyl alcohol, provides an effective chromate-free wash-primer which may be applied, for example by spraying, to surfaces such as steel and aluminum.

THEORETICAL CONSIDERATIONS

The effectiveness of the wash-primer composition in accordance with the present invention is achieved by replacing the chromate pigment of the conventional polyvinyl butyral resin based wash-primer with a carefully balanced mixture of non-toxic pigments such as polyphosphates and borates of zinc, aluminum, calcium and barium. The anticorrosion effect of zinc phosphate pigments is based on the formation, in the presence of water, of a protective layer of iron (III) phosphate complexes thus providing the known effect of zinc phosphate conversion coating on ferrous substrates. At the same time zinc hydroxide, formed as a byproduct, provides neutralizing effect to the acidic species resulting from the decomposition of the coating material or from electrochemical reaction taking place on the metal surface in the corrosive environment.

The anticorrosion effect of borate pigments is based on formation of alkaline hydrolysis products when in contact with moisture, thus providing a good buffering action against the acidic contaminants mentioned before.

Borate ions also form complexes with substrate metals thus creating an insoluble, impermeable protective layer which constitutes a barrier against corrosive environments.

Borate ions, in addition, for complexes with polyvinyl butyral resin making it less soluble in organic solvents. This process replaces, to a certain extent, the crosslinking of butyral resin which takes place in chromate wash-primers, and at the same time, provides excellent adhesion of the coating to steel, aluminum, zinc and other metals.

In order to further increase the adhesion of the coating to inorganic substrates, an additive of organo functional silane (silane coupling agent) may be introduced into the formulation.

Borate pigments, although very efficient in corrosion protection, have a tendency to settle in a can and to form a hard-to-redisperse cake of pigments. In order to prevent this, an antisettling additive may be used in the formulation. It has been found that so called hydrophobic silica, i.e. superficially treated pyrogenic silica, provides excellent antisettling properties without affecting coating performance. The antisettling action is augmented by the addition of an organic thixothropic agent, which functions also as a wetting agent facilitating pigment dispersion during the pigment grinding process.

To achieve the above properties a polyvinyl butyral resin, containing about 80–88% of butyral, 10–20% of hydroxyl and up to 2% of residual acetate is most useful. This formulation of the resin if not crosslinked, does not provide good resistance of the coatings to organic solvents. When complexed, however, with borate compounds, the insolubility of the resin film improves to an extent that after curing, it resembles a partially crosslinked polymer. In certain instances, the low crosslinking density provides advantageous properties, such as chemical stripability, for example. (Butvar B-76 or B-90 (Trade Marks) of Monsanto Chemical Co. represents this type of resin).

The polyphosphate pigments used in the formulation are represented for example, by basic aluminum-zinc tripoly phosphate hydrate, $AlZnP_3H_{10}.xH_2O$, and zinc phosphate hydrated, $Zn_3(PO_4)_2.H_2O$. The borate pigments employed in the formulation are for example, zinc borate ($2ZnO.3B_2O_3.3.5H_2O$), barium metaborate ($Ca.3B_2O_4.H_2O$), or calcium metaborate ($Ca.3B_2O_4.H_2O$).

Improvement of the adhesion of the coatings on inorganic substrates may be achieved by incorporating an adhesion promoter from the silane family. They are commercially available in two types, one (I) containing a side amine group (amioalkoxysilane) and the second (II) containing a hydrogen substituent (alkylalkoxysilane).

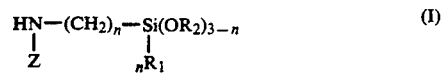

and

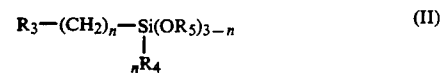

where Z is hydrogen or aminoalkyl group, $R_1$, $R_2$, $R_4$ and $R_5$ represent monovalent hydrocarbon group (1–4C), $R_3$ is methacryloxy, acryloxy, glycidoxy or epoxy cyclohexyl group, and n is zero or 1.

Examples of preferred adhesion promoters used in the invention are:

N-(beta-aminoethyl)-gamma-aminopropyl trimethoxy silane (Dow Corning Z-6020*),

N-beta-(N-vinyl-benzylamino)ethyl-gamma-aminopropyltrimethoxy silane (Dow Corning Z-6032*), Gamma-aminopropyl-trimethoxy silane (Union Carbide A-1100*), Gamma-methacryloxypropyl-trimethoxy silane (Dow Corning Z-6030*), Gamma-glicydoxypropyl-trimethoxy silane (Dow Corning Z-6040*), and Vinyl-tris(acetoxy) silane (Dow Corning Z-6075*).

*=Trade Mark

Other components of the wash-primer of this invention may be antisettling agents which prevent the formation of a difficult-to-redisperse pigment deposit. One of the antisettling agents is of mineral origin and is known as hydrophobic pyrogenic silica. This type of silica, which is superficially treated with organosilanes, exhibits also very good water repellent properties. When used as a paint additive, it lowers the water transmission rate into the coating, rendering it hydrophobic. Another additive incorporated into the formula may be a di-oleate salt of N-tallow trimethylenediamine. The compound serves a dual purpose; wetting the pigments thus facilitating their mechanical dispersion, and at the same time preventing the pigment particles from forming a hard-to-redisperse deposit. The wash primer composition may also include an inert extender (magnesium silicate), inert coloring pigments (iron oxide and carbon black), as well as a solvent mixture (alcohols) which matches the solubility parameter, hydrogen bond strength, and dipole moment of the polyvinyl butyral resin used in the wash-primer.

QUANTITATIVE CONSIDERATIONS

The proportions of the individual components in the wash-primer formulation may vary to a certain extent. As well the ratio of the base paint and catalyst may vary from 6:1 to 1:1 (preferably 4:1 by volume), without influencing the basic properties of the dry wash-primer coatings.

A preferred feature of the invention is that the weight ratio of borate to phosphate pigments remains between 3:1 to 5:1, (preferably 4:1 by weight). The total pigment and extender volume concentration may be contained between 23 and 30%, preferably 25%. Total anticorrosive pigment weight content may vary between 22% and 30%, preferably 26% per total non-volatile. Polyvinyl butyral resin weight content may change from 40% to 54% per total non-volatile, preferably attaining 47%. The silane adhesion promoter weight content is preferably maintained within 3.0 and 4.4 weight per cent (preferably 3.7%) of the total non-volatile and that of hydrophobic pyrogenic silica, within 2.0 and 3.8%, preferably 2.9% of the total non-volatile content.

EXAMPLES

The components of the pigmented part of the chromate-free wash-primer are placed in a ceramic ball mill and ground until the required fineness of grind is achieved. In all the examples cited below the same vehicle and diluent are used as follows:

Vehicle—10% by wt. solution of polyvinyl butyral resin in a solvent blend

Solvent blend—60:20 by wt. mixture of isopropanol and n-butanol

EXAMPLE 1

| Vehicle | 64.2 |
|---|---|
| Solvent Blend | 28.7 |
| Barium metaborate | 2.4 |
| Zinc borate | 0.6 |
| Zinc-Aluminum Polyphosphate | 0.6 |
| Talc | 1.5 |
| Coloring Pigments | 1.0 |
| Additives*) | 1.0 |
| Total: | 100.0 |

EXAMPLE 2

| Vehicle | 64.2 |
|---|---|
| Solvent Blend | 28.7 |
| Barium metaborate | 2.2 |
| Zinc borate | 0.7 |
| Zinc-Tripolyphosphate | 0.7 |
| Talc | 1.5 |
| Coloring Pigments | 1.0 |
| Additives*) | 1.0 |
| Total: | 100.0 |

EXAMPLE 3

| Vehicle | 64.2 |
|---|---|
| Solvent Blend | 28.7 |
| Barium metaborate | 2.0 |
| Zinc borate | 0.7 |
| Zinc-phosphate hydrate | 0.9 |
| Talc | 1.5 |
| Coloring Pigments | 1.0 |
| Additives*) | 1.0 |
| Total: | 100.0 |

*)pigment wetting agent, silane adhesion promoter and antisettling agent.

In all the above examples the weight ratio of catalyst (85% $H_3PO_4$) to non-volatile polyvinyl butyral resin remains constant, 1:2 making it however possible to operate within a range of various dilutions.

In using the composition according to the present invention, only a thin, wet, semi-transparent coat should be applied. The wet film thickness to achieve a recommended dry film thickness of 0.4 mils. should be approximately 5.8 mils. The coating has a spreading rate, at the recommended dry film thickness, of 0.145 l/sq. m., and a drying time at 25° C. of about 1 hour, to recoat.

Thus it is apparent that there has been provided in accordance with the invention a wash-primer base paint composition that fully satisfies the objective, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

1. A wash-primer base paint composition, to be mixed with a catalyst composition to produce a wash-primer which may be applied to the surface of predetermined metals, the base paint composition comprising the following ingredients in the following relative concentrations by weight:
   (a) about 40 to 54%, per total non-volatile, polyvinyl butyral resin, having 80 to 85% by weight butyral content, 10 to 20% hydroxyl content and 0 to 2% residual acetate content;
   (b) about 20 to 30%, per total non-volatile, anticorrosive pigments of a mixture of salts of borates and salts of phosphates, the weight ratio of borate salt to phosphate salt being between about 3:1 to 5:1, and, in addition to components (a) and (b),
   (c) the balance of the ingredients being at least one of:
      (i) a silane coupling agent
      (ii) hydrophobic pyrogenic silica
      (iii) inert extenders
      (iv) inert coloring pigments excluding the anticorrosive pigments of (b)
      (v) pigment wetting agents
      (vi) solvent blend.

2. A composition according to claim 1 wherein the solvent blend is a mixture of isopropanol and n-butanol.

3. A composition according to claim 1 wherein the solvent blend is a mixture of isopropanol and n-butanol in a weight ratio of about 60:20.

4. A composition according to claim 1 wherein the ingredients are present in the following relative concentrations by weight:
   (a) about 47% (per total non-volatile) polyvinyl butyral resin, and
   (b) about 26% (per total non-volatile) anti-corrosive pigment.

5. A composition according to claim 1 wherein the salts of phosphates are polyphosphate pigments selected from the group comprising basic aluminum-zinc tripoly phosphate hydrate, and zinc phosphate hydrate.

6. A composition according to claim 1 or 5 wherein the salts of borates are selected from the group consisting of zinc borate, aluminum borate, barium metaborate and calcium metaborate.

7. The composition of claim 1 in combination with, to be added separately, a catalyst comprising 85% phosphoric acid, wherein the ratio of composition to catalyst is 85:15 by weight.

8. The composition of claim 1 in combination with a catalyst comprising 85% phosphoric acid, wherein the ratio of composition to catalyst is 85:15 by weight.

9. A composition according to claim 7 or 8 wherein the weight ratio of catalyst to non-volatile polyvinyl butyral resin is 1:2.

* * * * *